United States Patent
Ota

(10) Patent No.: US 6,691,793 B2
(45) Date of Patent: Feb. 17, 2004

(54) WEEDER

(75) Inventor: Kinjiro Ota, Tokyo (JP)

(73) Assignee: OTA Kosan Corporation (JP)

( * ) Notice: Subject to any disclaimer, the term of this patent is extended or adjusted under 35 U.S.C. 154(b) by 0 days.

(21) Appl. No.: 10/337,073

(22) Filed: Jan. 6, 2003

(65) Prior Publication Data

US 2004/0007369 A1 Jan. 15, 2004

(30) Foreign Application Priority Data

Jul. 12, 2002 (JP) ........................................ 2002-204496

(51) Int. Cl.[7] ................................................ A01B 1/00
(52) U.S. Cl. ........................ 172/371; 294/50.9; 172/374
(58) Field of Search ................................ 172/374, 371, 172/373, 378; 294/50.9, 50.6, 50.8; 56/239; 16/112.1, 110.1

(56) References Cited

U.S. PATENT DOCUMENTS

| | | | | |
|---|---|---|---|---|
| 842,420 A | * | 1/1907 | Petty | 294/50.9 |
| 1,364,807 A | * | 1/1921 | Reitz | 294/50.9 |
| 1,752,467 A | * | 4/1930 | Strawn | 111/101 |
| 1,814,216 A | * | 7/1931 | Hartwell | 294/50.9 |
| 1,855,477 A | * | 4/1932 | Emery | 294/104 |
| 2,029,155 A | * | 1/1936 | Cervenka et al. | 294/50.9 |
| 2,749,088 A | * | 6/1956 | Jennens | 254/132 |
| 3,152,788 A | * | 10/1964 | Hardwidge | 254/132 |
| 3,246,877 A | * | 4/1966 | Lino | 254/132 |
| 3,272,548 A | * | 9/1966 | Taylor | 294/50.9 |
| 3,276,805 A | * | 10/1966 | Lambert | 294/19.1 |
| 3,885,824 A | * | 5/1975 | Hulst | 294/19.1 |
| 3,918,757 A | * | 11/1975 | Huber | 294/50.9 |
| 4,147,329 A | * | 4/1979 | Rodriguez | 254/132 |
| 4,157,198 A | * | 6/1979 | McDaniels | 294/50.9 |
| 4,547,010 A | * | 10/1985 | Camp | 294/50.9 |
| 4,779,913 A | * | 10/1988 | Henry | 294/50.9 |
| 4,846,286 A | * | 7/1989 | McNeely et al. | 172/379 |
| 4,930,825 A | * | 6/1990 | Dearman | 294/50.9 |
| 4,938,516 A | * | 7/1990 | Temple | 294/50.9 |
| 5,232,256 A | * | 8/1993 | Forbes | 294/19.1 |
| 5,375,401 A | * | 12/1994 | Flickinger | 56/239 |
| 5,427,424 A | * | 6/1995 | Robinson | 294/50.9 |
| 5,535,833 A | * | 7/1996 | Mathews | 172/371 |
| 5,615,541 A | | 4/1997 | Ota | |
| 6,016,876 A | * | 1/2000 | Rountree et al. | 172/378 |
| 6,290,211 B1 | * | 9/2001 | Pheiffer | 254/132 |

* cited by examiner

*Primary Examiner*—Victor Batson
(74) *Attorney, Agent, or Firm*—Dann, Dorfman, Herrell and Skillman, P.C.

(57) ABSTRACT

A weeder includes an elongated shaft having a predetermined length and a longitudinal bore, a gripping mechanism provided at an upper end portion of the elongated shaft, a chuck mechanism provided at a lower end portion of the elongated shaft for pinching weeds, an operating lever mechanism for actuating the chuck mechanism, the operating lever mechanism provided at an axial portion of the elongated shaft which is adjacent the gripping mechanism, and a towing wire inserted in the longitudinal bore of the elongated shaft and coupling the chuck mechanism and the operating lever mechanism.

10 Claims, 10 Drawing Sheets

WEEDER

BACKGROUND OF THE INVENTION

1. Field of the Invention

This invention relates to a weeder which a user can handle in a standing posture when the user is to pick up a weed or weeds (hereinafter referred to as "weeds") in the ground by using the weeder.

2. Description of the Related Art

U.S. Pat. No. 5,615,541, Kinjiro Ota, issued Apr. 1, 1997 and assigned to the assignee of the present application discloses a weeder which a user can operate in a standing posture when the user is to pick up weeds in the ground by using the weeder. The conventional weeder includes an elongated operating shaft, chuck means arranged at a lower end portion of the shaft for pulling out weeds by the roots, the chuck means including first and second chuck pawls for pinching the roots of the weeds, linkage means provided between the shaft and the chuck means, the linkage means including a pair of linkage members, grounding means for facilitating standing of the chuck means over the ground, spring means for urging the linkage means in such a direction as to cause the linkage means to be stretched, and locking means for releasably locking the linkage means and maintaining the chuck pawls of the chuck means in a closed state.

When a user is to pick up weeds in the ground by using the conventional weeder, the user grasps the operating shaft in a standing posture and places the grounding means on an area of the ground in which the weeds grow. In this condition, when the user pushes the shaft down against the ground, the first chuck pawl is stuck into the ground. When the user further pushes the shaft down against the ground, the linkage means is bent against an action of the spring means and the second chuck pawl is closed toward the first chuck pawl, whereby the weeds are pinched between the first chuck pawl and the second chuck pawl. Simultaneously, the first and second chuck pawls are maintained in the closed condition against the action of the spring means by means of the locking means.

In the conventional weeder, the pinching operation of the weeds between the chuck pawls is carried out with resort to the bending of the linkage means against the action of the spring means. Therefore, when the linkage means has play in it, there is a possibility that the chuck pawls will be unable to pinch the weeds therebetween, and even if the chuck pawls can pinch the weeds, there is a possibility that the chuck pawls will be unable to pull out the weeds by the roots when the weeds take strong roots.

SUMMARY OF THE INVENTION

The present invention has been made with a view to overcoming the foregoing problems of the prior art weeder.

It is an object of this invention to provide a weeder which can securely pull out weeds by the roots even if the weeds take strong roots.

It is another object of this invention to provide a weeder which a user can stably operate by hand.

It is still another object of this invention to provide a weeder having chuck means which is simple in construction and can securely pinch weeds.

It is yet another object of this invention to provide a weeder having operating lever means which is simple in construction and can stably actuate chuck means for pinching weeds.

It is still another object of this invention to provide a weeder which can positively remove weeds and/or mud from the weeder, even if the weeds and/or mud remain adhering to the weeder.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENT

A weeder according to the present invention will be discussed hereinafter with reference to the accompanying drawings.

Figure 1:
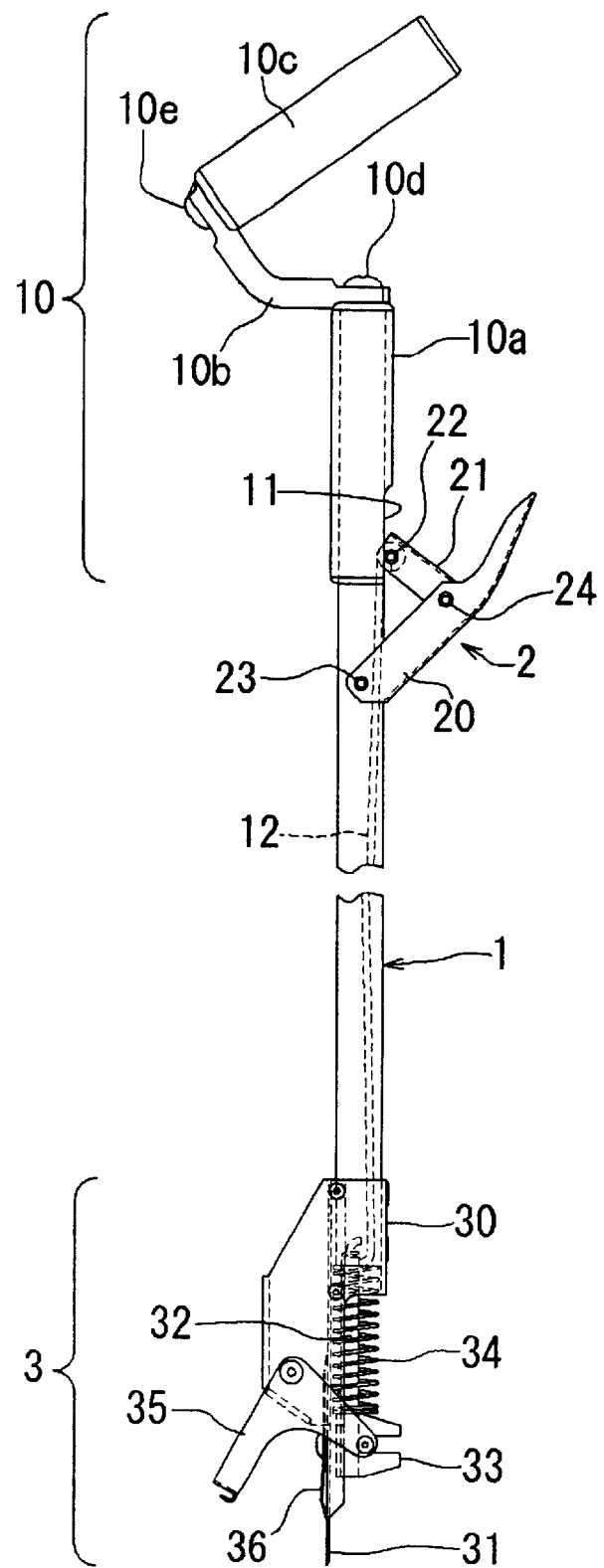
FIG. 1 is a schematic side view of the entire weeder according to an embodiment of the present invention.

Referring to FIG. 1, there is illustrated a weeder according to an embodiment of the present invention. The weeder generally includes an elongated cylindrical or pipe-like shaft 1, gripping means 10 provided at an upper end portion of the elongated cylindrical shaft 1, chuck means 3 provided at a lower end portion of the elongated cylindrical shaft 1 for pinching roots of weeds and pulling out the weeds by the roots, and operating lever means 2 provided on an axis of the elongated cylindrical shaft 1 for actuating the chuck means 3. The elongated cylindrical shaft 1 has a predetermined length long enough to allow a user to handle the weeder in a standing posture, and a longitudinal bore. In use of the weeder, the gripping means 10 is to be grasped by the user and the operating lever means 2 is to be actuated by the user.

In the illustrated embodiment, the components of the weeder other than the gripping means 10 (excluding a connecting section 10b) are made of metal and the elongated cylindrical shaft 1 is made of a cylindrical pipe material which has the predetermined length.

The gripping means 10 includes a first gripping section 10a mounted on the upper end portion of the elongated cylindrical shaft 1, a second gripping section 10c, and a connecting section 10b interconnecting the first gripping portion 10a and the second gripping portion 10c. The connecting section 10b is formed into a substantially L-shape as viewed from the side. More particularly, the connecting section 10b includes a first portion extending horizontally from an upper end of the first gripping section 10a, and a second portion obliquely extending upwardly from the first portion of the connecting section 10b in such a direction as to be away from the elongated cylindrical shaft 1. The second gripping section 10c obliquely extends upwardly from the second portion of the connecting section 10b in such a direction as to approach the elongated cylindrical shaft 1. The first gripping section 10a and the second gripping section 10c are spaced apart from each other through the connecting section 10b, so that the user can grasp the first gripping section 10a by one hand of the user and can grasp the second gripping section 10c by the other hand of the user in such a manner that the user's both hands do not interfere with each other. Therefore, the user can stably handle the weeder.

In the illustrated embodiment, the first and second gripping sections 10a, 10c are made of plastic pipe materials and the connecting section 10b is made of a metallic round bar material separately from the first and second gripping sections 10a, 10c. The first gripping section 10a is connected at an upper end thereof to a lower end of the connecting section 10b by means of a screw 10d and the second gripping section 10c is connected at a lower end thereof to an upper end of the connecting section 10b by means of a screw 10e. Incidentally, the entire gripping means 10 may be made of plastic material as a one-piece member comprising the first and second gripping sections 10a, 10c and the connecting section 10b.

Figure 2:
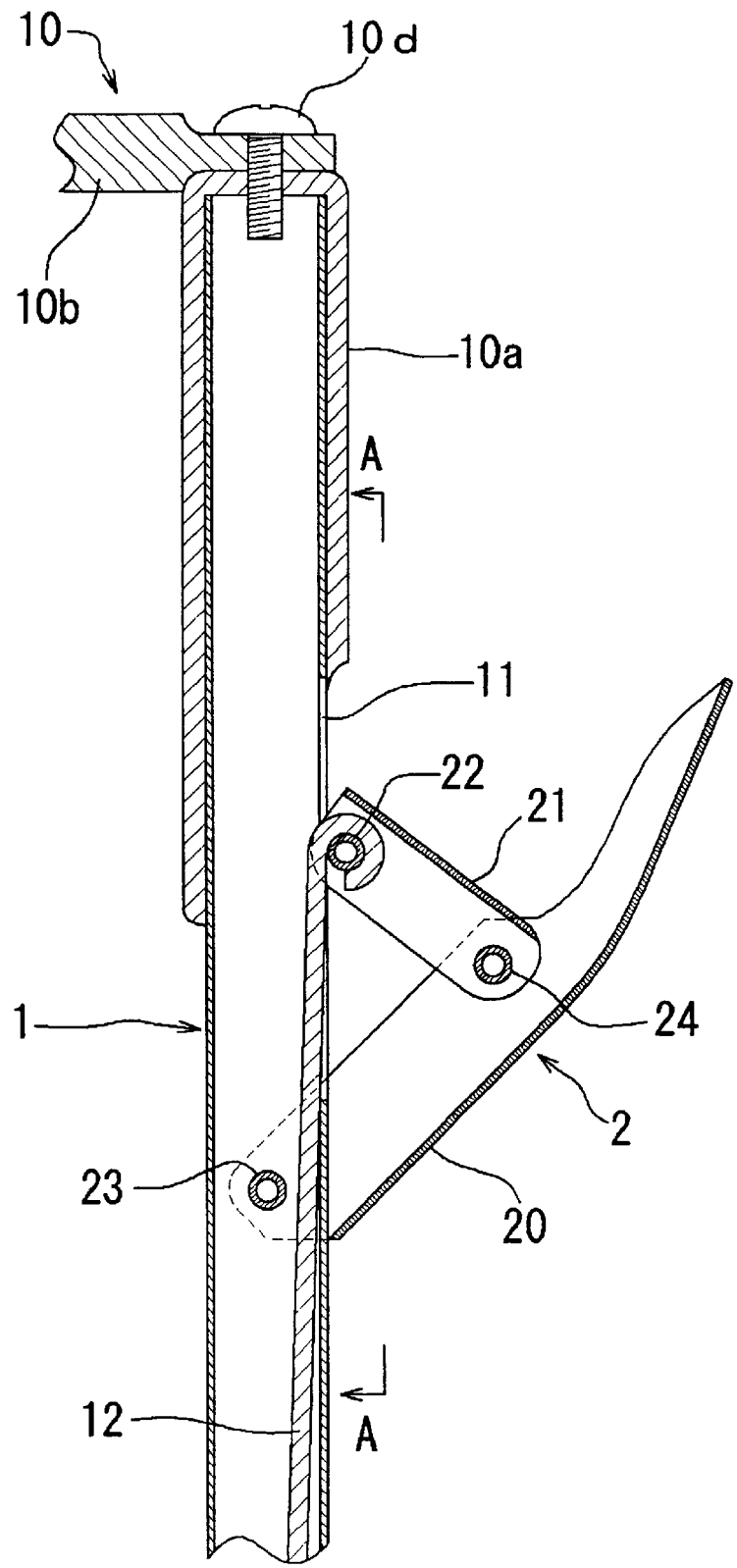
FIG. 2 is a schematic enlarged sectional side view of gripping means and operating lever means of the weeder.
Figure 3:
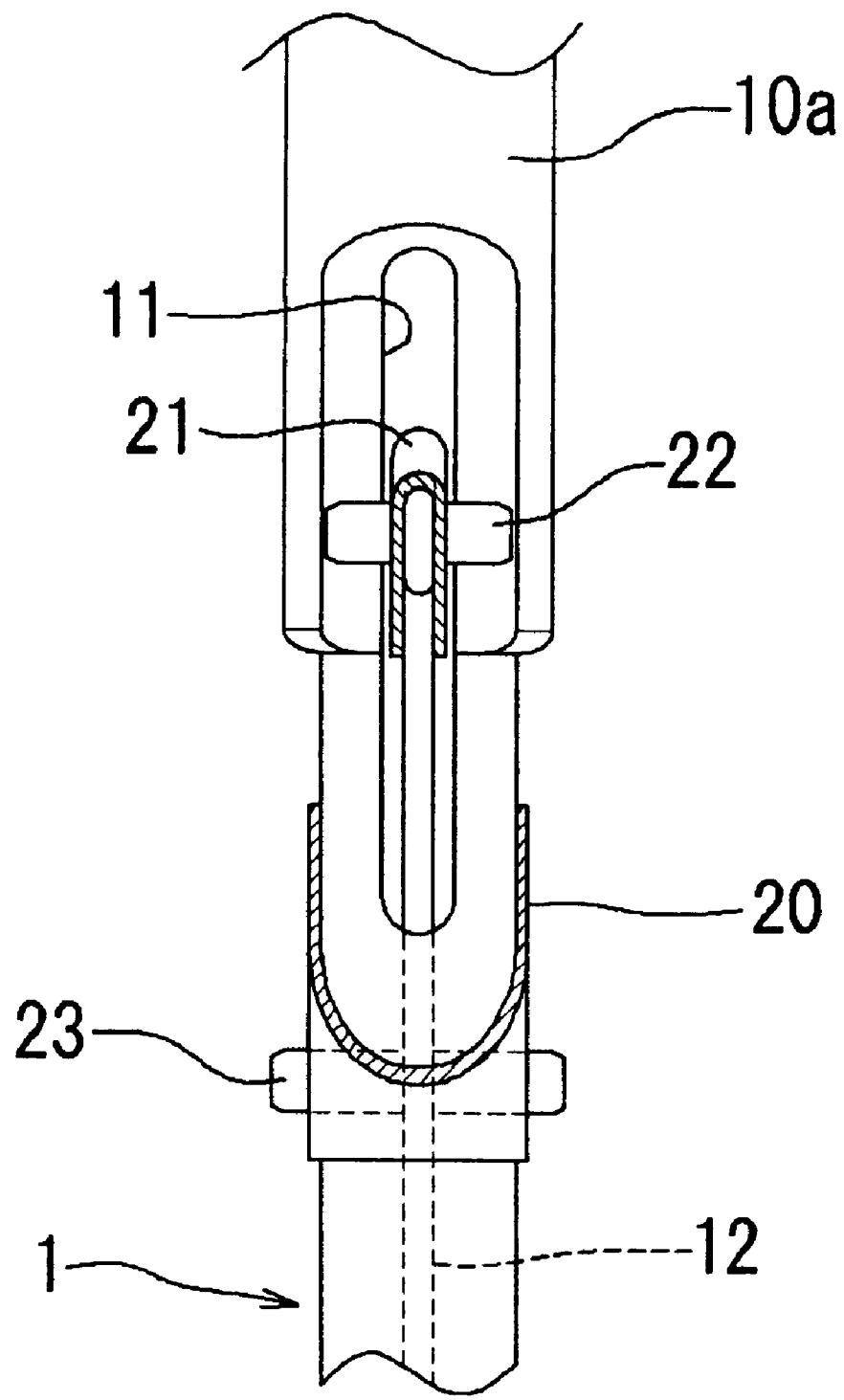
FIG. 3 is a schematic sectional view of the gripping means and operating lever means of FIG. 2, taken on a plane indicated in FIG. 2 by a line A—A.

Referring to FIGS. 2 and 3, the operating lever means 2 includes a lever body 20, an operating piece 21, and a guide pin 22. The lever body 20 is formed into a substantially U-shape in cross-section. The lever body 20 is pivotally supported at an end portion thereof to the axis of the elongated cylindrical shaft 1 by means of a support pin 23 with both sides of the end portion of the lever body 20 straddling the axis of the elongated cylindrical shaft 1, and obliquely extends upwardly in the direction opposite to the direction in which the connecting section 10b extends. The operating piece 21 is formed into a substantially U-shape in cross-section and has first and second end portions. The operating piece 21 is received at the first end portion thereof in the lever body 20 having a substantially U-shape in cross-section as described above, pivotally supported at the first end portion thereof to the approximately middle portion of a longitudinal direction of the lever body 20 by means of a support pin 24, and obliquely extends upwardly toward the first gripping section 10a from the lever body 20. The guide pin 22 is provided at the second end portion of the operating piece 21 in such a manner to penetrate through both sides of the substantially U-shaped operating piece 21.

A combination of the elongated cylindrical shaft 1 and the first gripping section 10a is formed with a vertically extending slit 11 in a lower end portion of the first gripping section 10a and a portion of the elongated cylindrical shaft 1 which positionally corresponds to the lower end portion of the first gripping section 10a. The second end portion of the operating piece 21 is received in the vertically extending slit 11 in such a manner that the guide pin 22 can be slid along the vertically extending slit 11. Inserted in the longitudinal bore of the elongated cylindrical shaft 1 is a towing wire 12 which is engaged at an upper end thereof with an axis of the guide pin 22 by hooking the upper end of the towing wire 12 on the axis of the guide pin 22.

The towing wire 12 is coupled at a lower end there of to the chuck means 3 as will be discussed in greater detail hereinafter. When the lever body 20 is pivoted about the support pin 23 by the user's hand in such a direction as to approach the first gripping section 10a as indicated by an arrow in FIG. 4, the operating piece 21 is moved upwardly. Simultaneously, the guide pin 22 is slid upwardly along the vertically extending slit 11 while pulling the towing wire 12 upwardly, thereby actuating the chuck means 3 as will be discussed in greater detail hereinafter.

Referring to FIGS. 5–8, the chuck means 3 includes a base frame 30 provided at the lower end portion of the elongated cylindrical shaft 1, a sticking paddle 31, a movable plate 32, an engaging piece 33, a coil spring 34, and a swinging frame 35.

Figure 5:
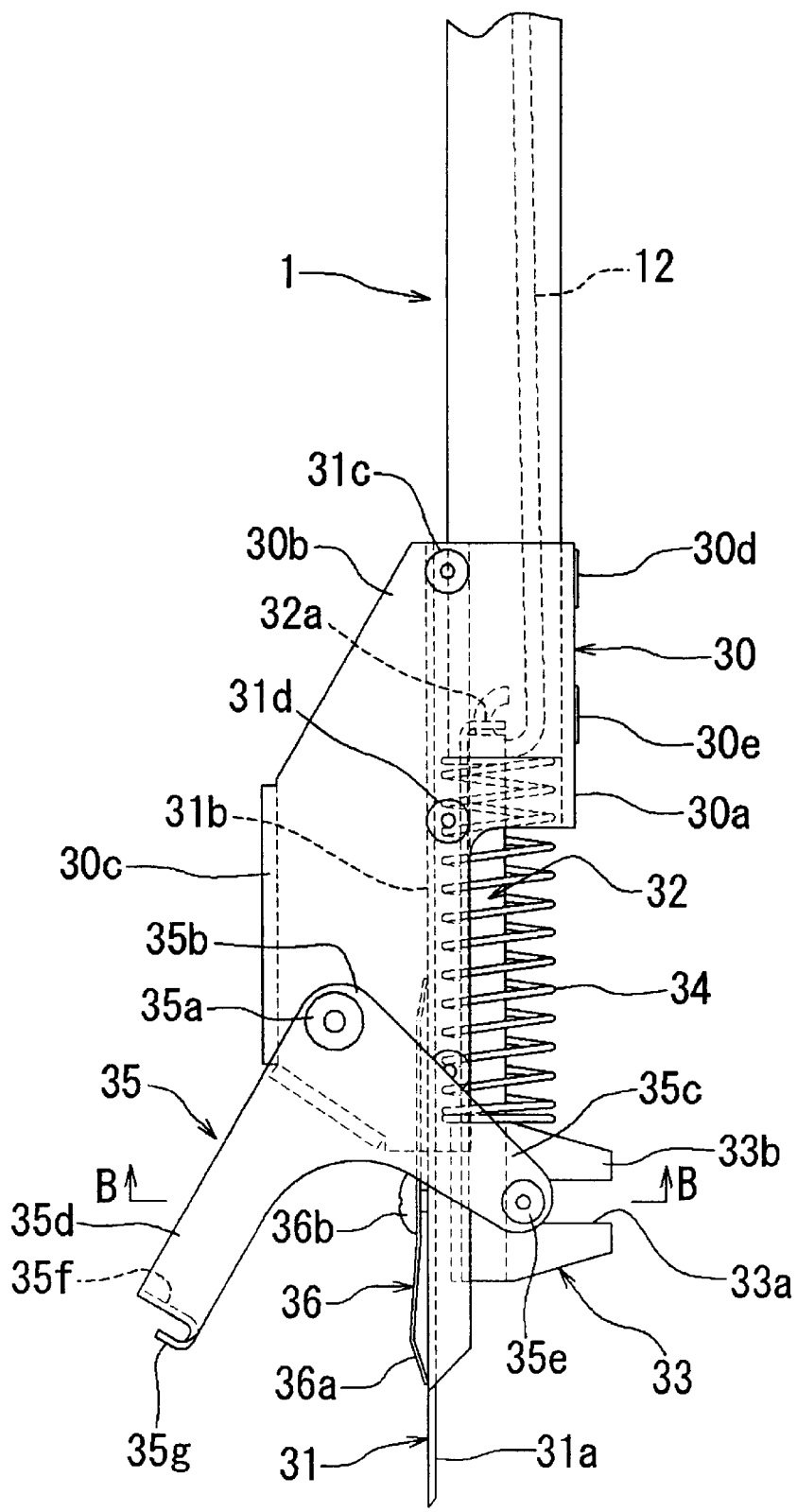
FIG. 5 is a schematic enlarged side view of chuck means of the weeder.
Figure 6:
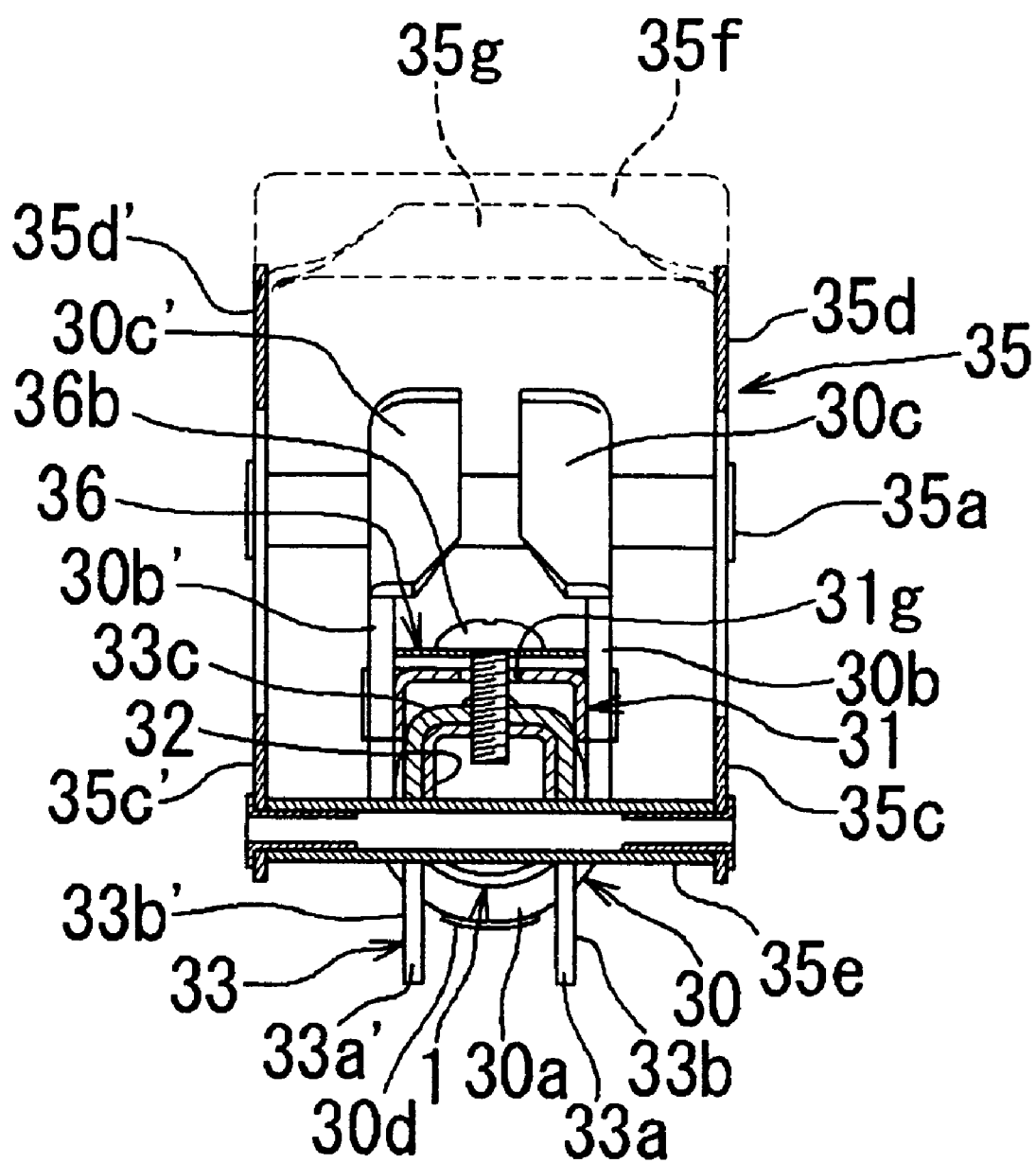
FIG. 6 is a schematic sectional view of the chuck means, taken on a plane indicated in FIG. 5 by a line B—B.

As shown in FIG. 6, the base frame 30 includes a base portion 30a of a substantially semicircular shape in cross-section which is mounted on the elongated cylindrical shaft 1, a pair of spaced apart side portions 30b, 30b' projecting laterally from the base portion 30a, each of spaced apart side portions 30b, 30b' having a substantially trapezoidal shape as viewed from the side (see FIGS. 5 and 7), and back plate portions 30c, 30c' extending from the spaced apart side portions 30b, 30b' in such a direction as to be opposed to each other.

Figure 7:
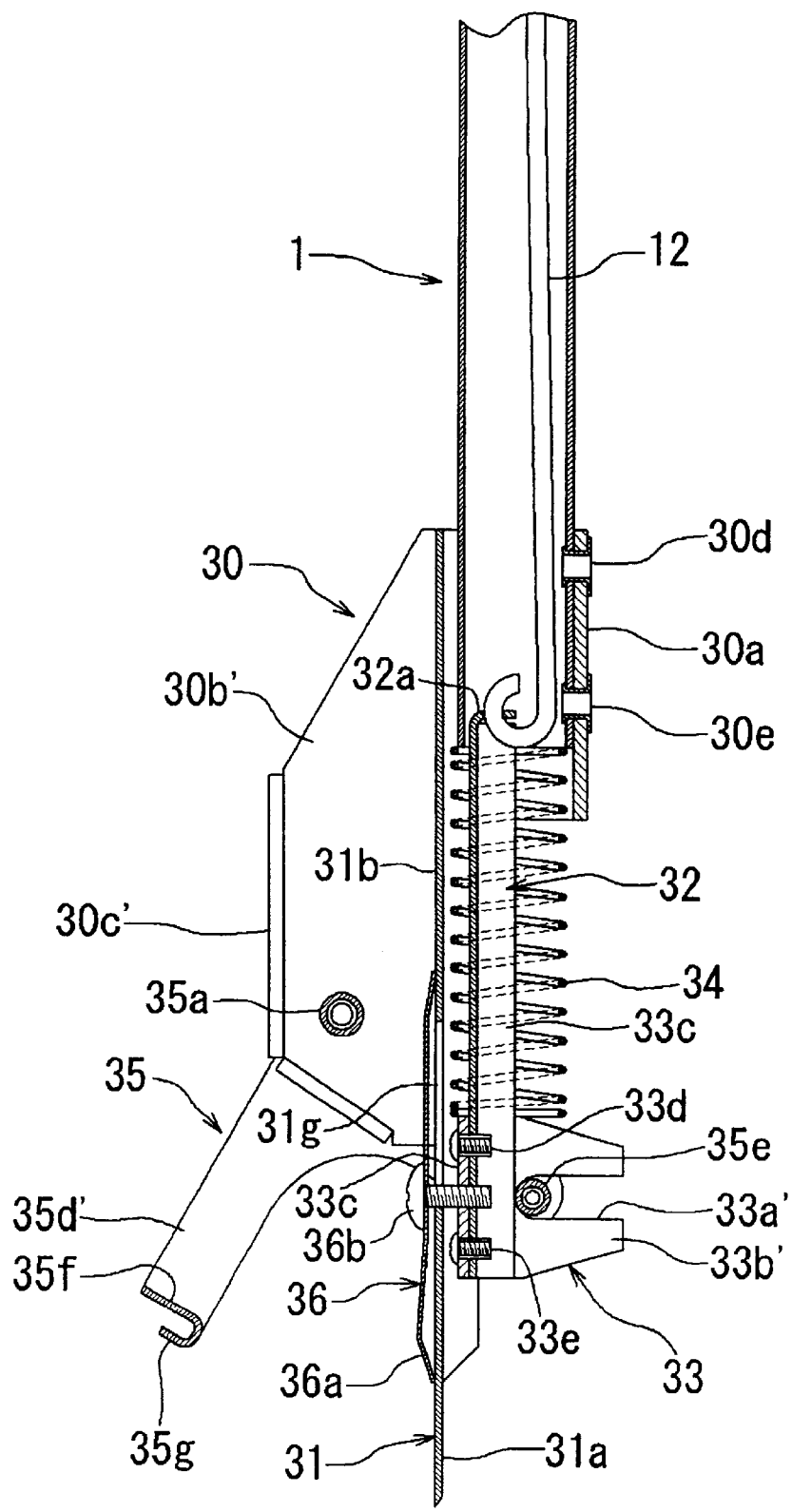
FIG. 7 is a schematic enlarged sectional side view of the chuck means.

As shown in FIG. 7, the base frame 30 is attached to the elongated cylindrical shaft 1 with the base portion 30a thereof being mounted on the elongated cylindrical shaft 1 and being fastened to the elongated cylindrical shaft 1 by means of rivets 30d, 30e, and with the side portions 30b, 30b' projecting laterally from the elongated cylindrical shaft 1. The base portion 30a has a length which extends from the upper ends of the spaced apart side portions 30b, 30b' to the approximately middle regions of a vertical direction of the side portions 30b, 30b' and is notched in a lower end region of the base portion 30a.

Figure 8:
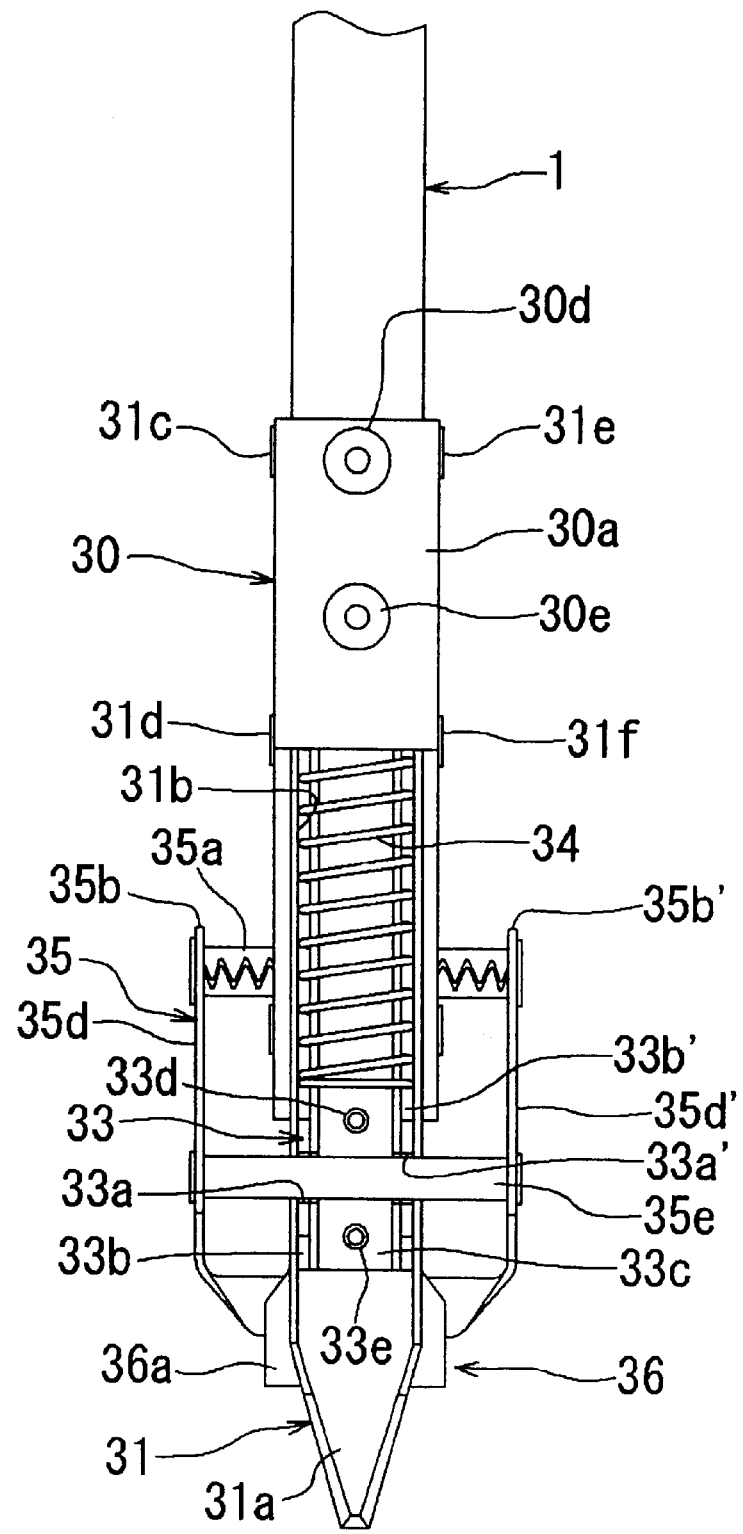
FIG. 8 is a schematic rear side view of the chuck means.

As shown in FIG. 8, the sticking paddle 31 includes an elongated paddle body 31b having a substantially U-shape in cross-section, and an acute-angled blade 31a provided at a lower end of the paddle body 31b. The sticking paddle 31 is attached to the spaced apart side portions 30b, 30b' of the base frame 30 by means of rivets 31c, 31d, 31e, 31f with the paddle body 31b being interposed between the spaced apart side portions 30b, 30b' of the base frame 30 and with the blade 31a extending downwardly from lower edges of the spaced apart side portions 30b, 30b' of the base frame 30.

As shown in FIGS. 5 and 6, the movable plate 32 has an elongated body of a substantially U-shape in cross-section which has a width less than the paddle body 31b of the sticking paddle 31. The movable plate 32 is provided at an upper end thereof with a bent piece 32a to which the lower end of the towing wire 12 is coupled. The movable plate 32 is arranged so as to be opposed to the paddle body 31b of the sticking paddle 31 and received in the bore of the elongated cylindrical shaft 1 from the lower end of the elongated cylindrical shaft 1. The bent piece 32a of the movable plate 32 is coupled to the lower end of the towing wire 12 as described above, so that when the towing wire 12 is pulled upwardly, the movable plate 32 is moved upwardly.

As shown in FIGS. 7 and 8, the engaging piece 33 has a substantially U-shaped body in cross-section which includes a pair of spaced apart side portions 33b, 33b' and an intermediate portion 33c interconnecting the spaced apart side portions 33b, 33b'. The spaced apart side portions 33b, 33b' of the engaging piece 33 are formed with notches 33a, 33a' which are aligned with each other. Each of the notches 33a, 33a' has a substantially U-shape. The engaging piece 33 has a width less than the paddle body 31b. The engaging piece 33 is received in the paddle body 31b, mounted on a lower end portion of the movable plate 32, fastened at the intermediate portion 33c thereof to the movable plate 32 by means of screws 33d, 33e, and projected in the direction opposite to the direction in which the spaced apart side portions 30b, 30b' of the base frame 30 are projected. The engaging piece 33 is adapted to be slid along the sticking paddle 31 when the movable plate 32 is moved.

Figure 4:
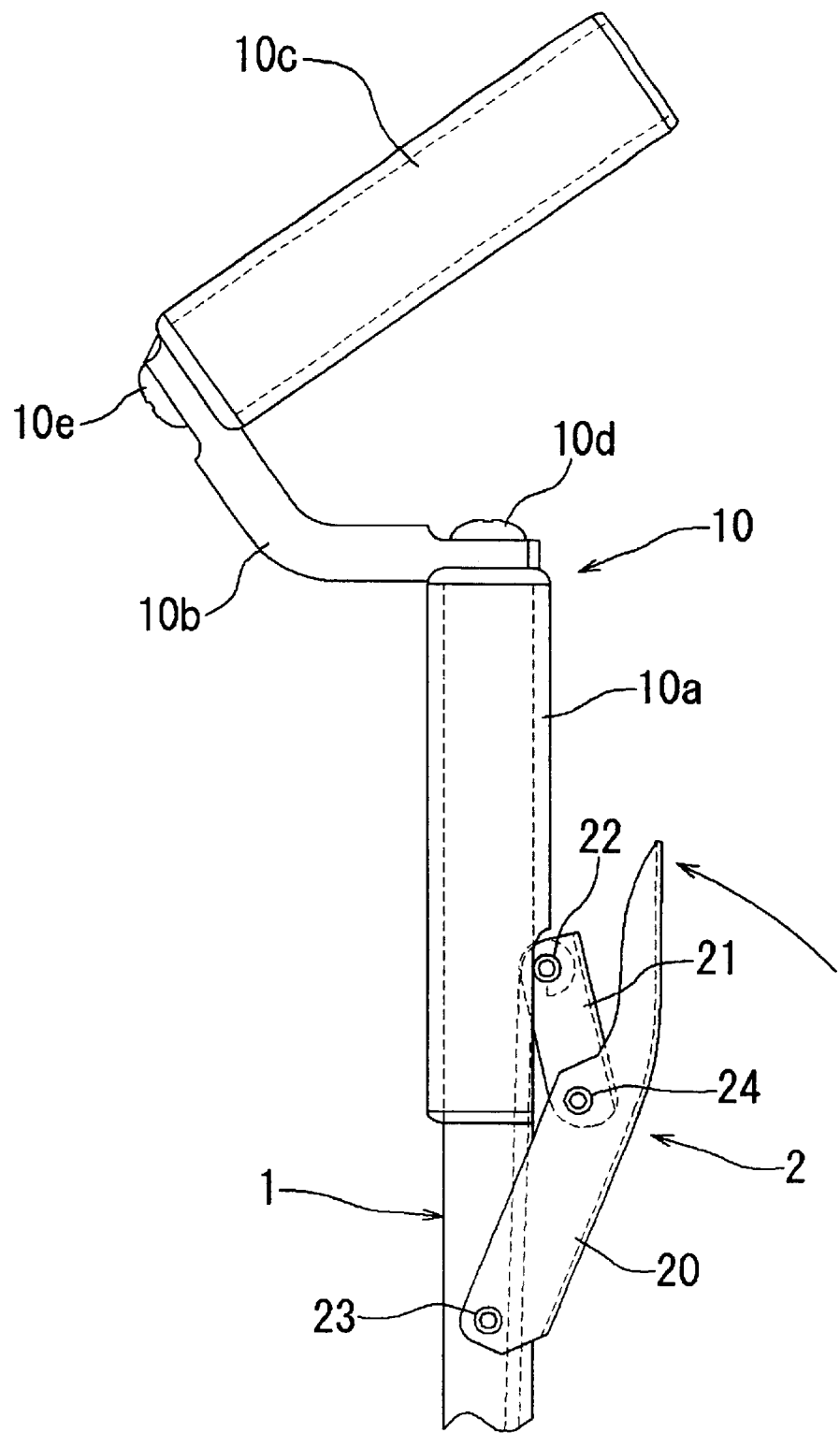
FIG. 4 is a schematic enlarged side view of the weeder and of assistance in explaining the operation of the lever means.

As shown in FIG. 7, the coil spring 34 is mounted around the movable plate 32 and disposed between the lower end of the elongated cylindrical shaft 1 and an upper edge of the engaging piece 33. As described above, when the lever body 20 is pivoted about the support pin 23 by the user's hand as indicated by the arrow in FIG. 4, the operating piece 21 of the operating lever means 2 is moved upwardly as shown in FIG. 4 and the towing wire 12 is pulled upwardly. By the upward pulling of the towing wire 12, the movable plate 32 is moved upwardly while causing the coil spring 34 to be compressed. When the lever body 20 is released from the user's hand, the coil spring 34 expands, thereby causing the movable plate 32 to be moved downwardly.

As shown in FIGS. 5 and 6, the swinging frame 35 includes a pair of spaced apart side sections and a connecting section 35f interconnecting the spaced apart side sections of the swinging frame 35. Each of the spaced apart side sections of the swinging frame 35 is formed into a substantially inverted V-shape. One of the spaced apart side sections of the swinging frame 35 comprises a first arm portion 35c, a second arm portion 35d, and a first apex region 35b interposed between the first and second arm portions 35c, 35d. Similarly, the other of the spaced apart side sections of the swinging frame 35 comprises a third arm portion 35c', a fourth arm portion 35d', and a second apex region 35b' interposed between the third and fourth arm portion 35c', 35d'. The swinging frame 35 is mounted on the side portions 30b, 30b' of the base frame 30 and pivotally supported at the first and second apex regions 35b, 35b' of the substantially inverted V-shaped side sections of the swinging frame 35 to the side portions 30b, 30b' of the base frame 30 by means of a support pin 35a. The first arm portion 35c and the third arm portion 35c' extend toward the engaging piece 33 from the first and second apex regions 35b, 35b', and the second arm portion 35d and fourth arm portion 35d' extend from the first and second apex regions 35b, 35b' in the direction opposite to the direction in which the first and third arm portions 35c, 35c' extend. A pin 35e is provided at the swinging frame 35 so as to be penetrated through tip ends of the first and third arm portions 35c, 35c'. The pin 35e is engaged with the notches 33a, 33a' of the engaging piece 33. The connecting section 35f of the swinging frame 35 is disposed between tip ends of the second and fourth arm portions 35d, 35d'. The connecting section 35f has a clamping pawl 35g which is formed by bending a portion of the connecting section 35f.

The weeder further includes a remover paddle 36 for removing weeds and/or mud from the sticking paddle 31. As shown in FIGS. 7 and 8, the remover paddle 36 includes an elongated body and a substantially trapezoid-shaped blade 36a provided at a lower end of the elongated body of the remover paddle 36. The blade 36a has a width larger than the blade 31a of the sticking paddle 31. The remover paddle 36 is applied onto a side of the paddle body 31b of the sticking paddle 31 which is opposite to a side of the paddle body 31b of the sticking paddle 31 at which the engaging piece 33 is arranged, and is attached to the movable plate 32 by means of a screw 36b which penetrates through a vertically extending slit 31g formed in the paddle body 31b of the sticking paddle 31. The remover paddle 36 is angularly bent at upper and lower end portions thereof or is formed into a leaf spring-form, thereby exhibiting elasticity. When the movable plate 32 is moved, the remover paddle 36 is slid along the sticking paddle 31.

In the weeder of the present invention which is constructed as described above, the user can handle the weeder in a standing posture without taking an unnatural posture in such a manner to bend the upper half of the user's body, so that the weeder will not impose on the user the physical burden.

Figure 9:
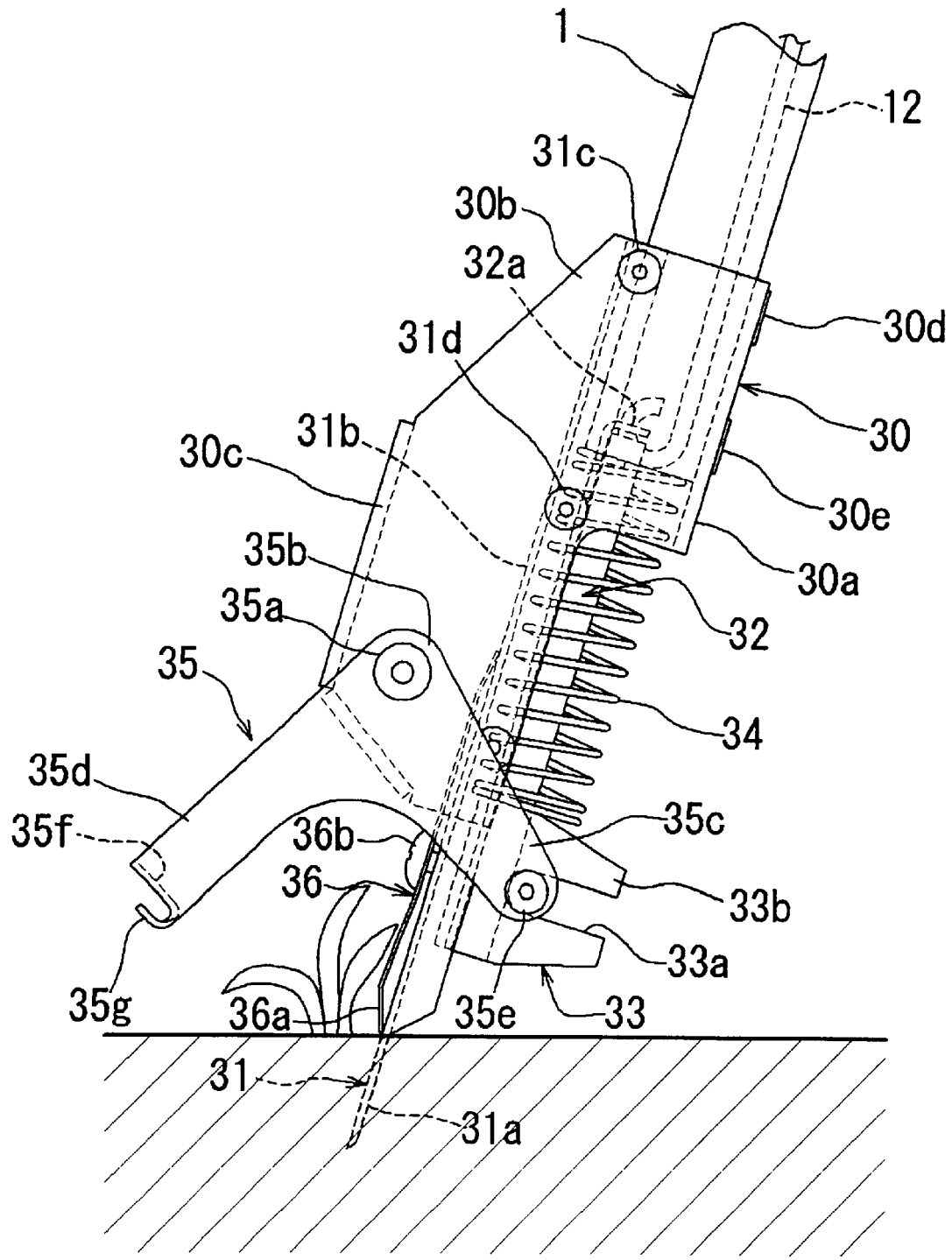
FIGS. 9 and 10 are each a schematic enlarged side view of the weeder and of assistance in explaining the operation of the weeder.
Figure 10:
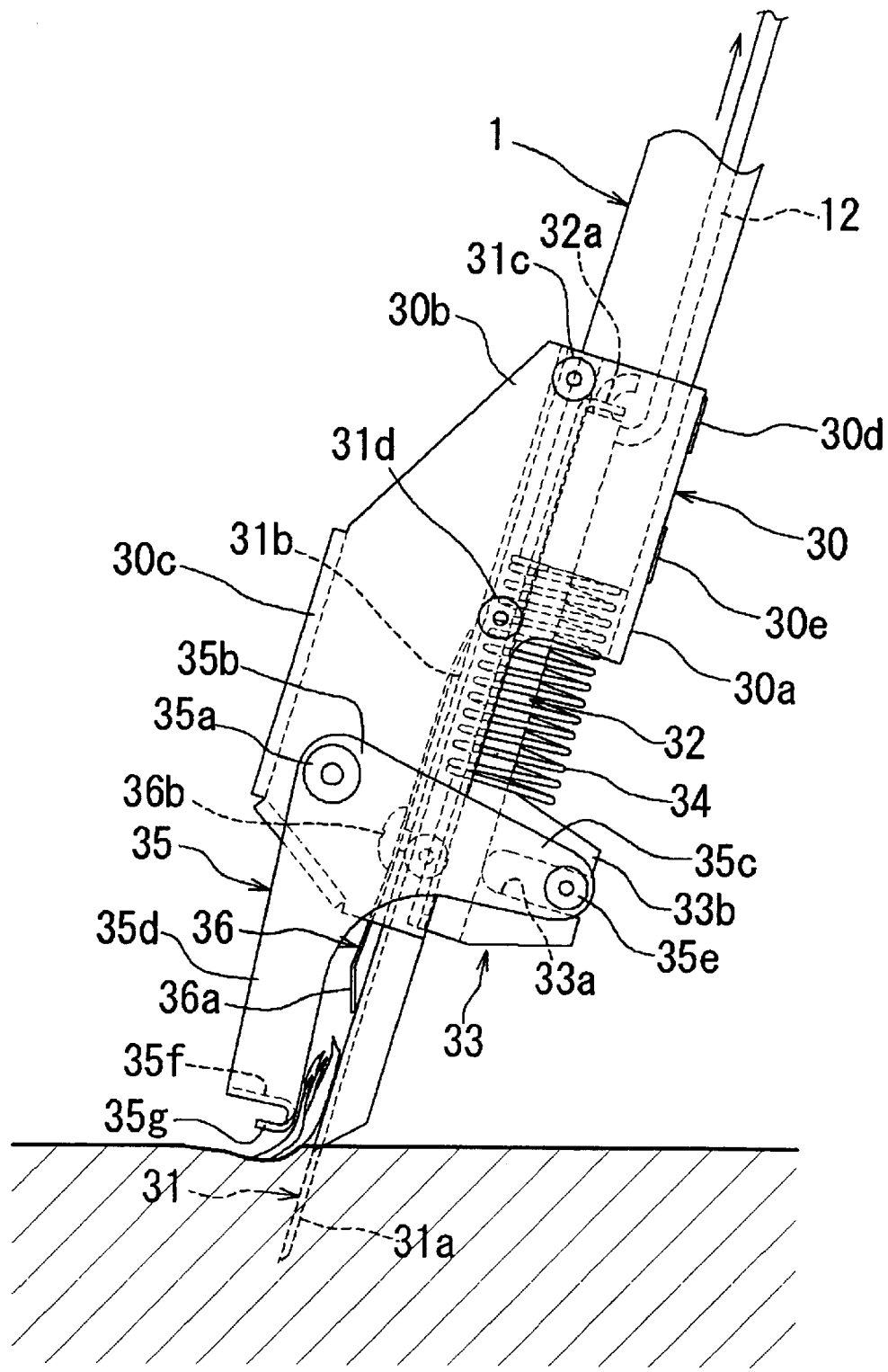

Referring now to FIGS. 4, 9 and 10, the operation of the weeder according to the embodiment of the present invention will be described hereinafter. When the user is to pick up weeds in the ground by using the weeder of the present invention, the user grasps the first and second gripping sections 10a, 10c by the user's both hands in a standing posture and sticks an edge of the blade 31a of the sticking paddle 31 into the ground in such a manner that the edge of the blade 31a is located near an area of the ground in which the weeds grow as shown in FIG. 9. In this condition, when the user grasps tightly the lever body 20 of the operating lever means 2 by hand in such a manner to cause the lever body 20 to be pivoted about the support pin 23 as indicated by the arrow in FIG. 4, the operating piece 21 of the operating lever means 2 is moved upwardly and the guide pin 22 is slid upwardly along the vertically extending slit 11 while pulling the towing wire 12 upwardly.

By the upward pulling of the towing wire 12, the movable plate 32 is moved upwardly against an action of the coil spring 34. Simultaneously, the swinging frame 35 which is engaged with the engaging piece 33 through the pin 35e of the swinging frame 35 and the notches 33a, 33a' of the engaging piece 33 provided integrally with the movable plate 32 is swung about the support pin 35a and the clamping pawl 35g approaches the sticking paddle 31, whereby the weeds are pinched between the clamping pawl 35g and the sticking paddle 31 as shown in FIG. 10. In this condition, when the user pulls the elongated cylindrical shaft 1 up, the weeds can be pulled out by the roots.

In the operation of the chuck means 3, the engaging piece 33 is guided by the paddle body 31b of the sticking paddle 31, so that the swinging frame 35 can be stably swung. In state where the weeds are chucked between the clamping pawl 35g and the sticking paddle 31, when the user's grasping force is further still applied to the lever body 20 of the operating lever means 2, it is transmitted to the clamping pawl 35g and the sticking paddle 31 as a weed-chucking force, so that when the user pulls the elongated cylindrical shaft 1 up, the weeds can be securely pulled out by the roots by the cooperation of the clamping pawl 35g and the sticking paddle 31. The user can stably handle the weeder while grasping the first gripping section 10a and the second gripping section 10c with the user's both hands as described above, so that even if the weeds take strong roots, the user will be able to easily pull out the weeds by the roots using the weeder.

After the weeds are pulled out by the roots by the weeder, when the grasping force having been applied to the operating lever body 20 by the user is released from the lever body 20 of the operating lever means 2, the coil spring 34 which has been compressed until now expands. As a result, the movable plate 32 is moved downwardly due to the action of the coil spring 34, whereby the swinging frame 35 which is engaged with the engaging piece 33 through the pin 35e of the swinging frame 35 and the notches 33a, 33a' of the engaging piece 33 returns to an original position.

Simultaneously, the clamping pawl 35g of the swinging frame 35 is moved away from the blade 31a of the sticking paddle 31. As a result, the weeds are released from the clamping pawl 35g and the sticking paddle 31.

The remover paddle 36 is attached to the movable plate 32 through the pin 36b penetrating the slit 31g of the sticking paddle 31 as discussed above, so that when the movable plate 32 is moved downwardly due to the action of the coil spring 34, the remover paddle 36 is slid downwardly along the sticking paddle 31. Therefore, even if the weeds and/or mud remains attached onto the sticking paddle 31 after the clamping pawl 35g of the swinging frame 35 is moved away from the blade 31a of the sticking paddle 31, the weeds and mud can be positively removed from the sticking paddle 31 by the downward movement of the remover paddle 36 along the sticking paddle 31. Incidentally, simultaneously with the returning of the swinging frame 35 to the original position, the operating lever means 2 and the coil spring 34 are returned to their original conditions.

As discussed above, in the weeder according to the present invention, when the user grasps tightly the lever body 20 by hand in such a manner to cause the lever body 20 to be pivoted about the support pin 23, the operating piece 21 of the operating lever means 2 is moved upwardly and the guide pin 22 is slid upwardly along the vertically extending slit 11 while pulling the towing wire 12 upwardly, whereby the chuck means 3 is actuated. That is, the grasping force of the lever body 20 by the user is transmitted to the chuck means 3 as a weed-chucking force or a weed-pinching force, whereby the weeds are strongly pinched by the clamping pawl 35g and the sticking paddle 31. Therefore, when the user pulls the weeder up in condition where the weeds are pinched between the clamping pawl 35g and the sticking paddle 31, the weeds can be positively pulled out by the roots.

In the weeder according to the present invention, the user can use the weeder while grasping the first gripping section 10a by one hand of the user and grasping the second gripping section 10c by the other hand of the user, so that the user can stably handle the weeder.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A weeder, which a user can handle in a standing posture, comprising:
    an elongated shaft having a predetermined length and a longitudinal bore;
    gripping means provided at an upper end portion of said elongated shaft;
    chuck means provided at a lower end portion of said elongated shaft for pinching weeds;
    operating lever means for actuating said chuck means; and
    a towing wire inserted in said longitudinal bore of said elongated shaft and coupling said chuck means and said operating lever means;
    said operating lever means including a lever body pivotally supported to an axial portion of said elongated shaft which is adjacent said gripping means, said lever body obliquely extending upwardly from said elongated shaft in such a manner to be away from said elongated shaft, an operating piece having first and second end portions, said operating piece pivotally supported at said first end portion thereof to said lever body and obliquely extending upwardly from said lever body in such a direction as to approach said elongated shaft, and a guide pin provided at said second end portion of said operating piece, wherein a combination of said elongated shaft and said gripping means has a vertically extending slit, and wherein said towing wire is connected at a lower end thereof to said chuck means and connected at an upper end thereof to said guide pin through said vertically extending slit so that when said lever body is pivoted in such a direction as to approach said elongated shaft, said operating piece is moved upwardly while causing said guide pin to be slid upwardly along said vertically extending slit, whereby said towing wire is pulled upwardly so as to actuate said chuck means.

2. A weeder as defined in claim 1, wherein said gripping means includes a first gripping section mounted on said upper end portion of said elongated shaft and adapted to be grasped by one hand of the user in use of said weeder, a second gripping section adapted to be grasped by the other hand of the user in use of said weeder, and a connecting section interconnecting said first gripping section and second gripping section, said connecting section having a first portion extending horizontally from an upper end of said first gripping section at a side of said elongated shaft which is opposite to a side of said elongated shaft at which said operating lever means is arranged, and a second portion obliquely extending upwardly from said first portion of said connecting section in such a direction as to be away from said elongated shaft, said second gripping section obliquely extending upwardly from said second portion of said connecting section in such a direction as to approach said elongated shaft.

3. A weeder as defined in claim 2, wherein said chuck means includes a base frame mounted on said lower end portion of said elongated shaft and projecting laterally from said elongated shaft, a sticking paddle provided at said base frame and having an acute-angled blade extending downwardly from said base frame, a movable plate arranged so as to be opposed to said sticking paddle and received in said longitudinal bore of said elongated shaft from said lower end portion of said elongated shaft, said movable plate being connected at an upper end portion thereof to a lower end of said towing wire, an engaging piece provided at a lower end portion of said movable plate and projecting laterally in the direction opposite to the direction in which said base frame laterally projects, said engaging piece having notch means, a coil spring mounted around said movable plate and disposed between said lower end portion of said elongated shaft and said engaging piece, swinging frame means pivotally supported to said base frame, said swinging frame including a substantially inverted V-shaped body, said substantially inverted V-shaped body having first and second arm means extending in the direction opposite to each other, said first arm means provided at a tip end thereof with a pin, said pin of said first arm means being engaged with said notch means of said engaging piece, said second arm means provided at a tip end thereof with a clamping pawl, wherein when said operating lever means is operated, said towing wire is pull upwardly to cause said movable plate to be moved upwardly against an action of said coil spring while causing said swinging frame to be pivoted, whereby said clamping pawl approaches said sticking paddle to pinch the weeds in cooperation with said sticking paddle.

4. A weeder as defined in claim 3, wherein said base frame has a body of a substantially U-shape in cross-section, said sticking paddle has a paddle body of a substantially U-shape in cross-section, said paddle body received in said base frame with both side portions thereof being interposed between both sides of said U-shaped body of said base frame, said movable plate is received in said substantially U-shaped paddle body so as to be slid along said sticking paddle, and said operating piece has a body of a substantially U-shape in cross-section.

5. A weeder as defined in claim 4, wherein said weeder further includes a remover paddle for removing the weeds and/or mud, said remover paddle having a blade, and said paddle body of said sticking paddle has a vertically extending slit, said remover paddle being arranged at a side of said sticking paddle which is opposite to a side of said sticking paddle at which said movable plate is arranged, said remover paddle being attached to said movable plate by a pin which penetrates said vertically extending slit of said sticking paddle.

6. A weeder as defined in claim 3, wherein said weeder further includes a remover paddle for removing the weeds and/or mud, said remover paddle having a blade, and said paddle body of said sticking paddle has a vertically extending slit, said remover paddle being arranged at a side of said sticking paddle which is opposite to a side of said sticking paddle at which said movable plate is arranged, said remover paddle being attached to said movable plate by a pin which penetrates said vertically extending slit of said sticking paddle.

7. A weeder as defined in claim 1, wherein said chuck means includes a base frame mounted on said lower end portion of said elongated shaft and projecting laterally from said elongated shaft, a sticking paddle provided at said base frame and having an acute-angled blade extending downwardly from said base frame, a movable plate arranged so as to be opposed to said sticking paddle and received in said longitudinal bore of said elongated shaft from said lower end portion of said elongated shaft, said movable plate being connected at an upper end portion thereof to a lower end of said towing wire, an engaging piece provided at a lower end portion of said movable plate and projecting laterally in the direction opposite to the direction in which said base frame laterally projects, said engaging piece having notch means, a coil spring mounted around said movable plate and disposed between said lower end portion of said elongated shaft and said engaging piece, swinging frame means pivotally supported to said base frame, said swinging frame including a substantially inverted V-shaped body, said substantially inverted V-shaped body having first and second arm means extending in the direction opposite to each other, said first arm means provided at a tip end thereof with a pin, said pin of said first arm means being engaged with said notch means of said engaging piece, said second arm means provided at a tip end thereof with a clamping pawl, wherein when said operating lever means is operated, said towing wire is pull upwardly to cause said movable plate to be moved upwardly against an action of said coil spring while causing said swinging frame to be pivoted, whereby said clamping pawl approaches said sticking paddle to pinch the weeds in cooperation with said sticking paddle.

8. A weeder as defined in claim 7, wherein said base frame has a body of a substantially U-shape in cross-section, said sticking paddle has a paddle body of a substantially U-shape in cross-section, said paddle body received in said base frame with both side portions thereof being interposed between both sides of said U-shaped body of said base frame, said movable plate is received in said substantially U-shaped paddle body so as to be slid along said sticking paddle, and said operating piece has a body of a substantially U-shape in cross-section.

9. A weeder as defined in claim 8, wherein said weeder further includes a remover paddle for removing the weeds and/or mud, said remover paddle having a blade, and said paddle body of said sticking paddle has a vertically extending slit, said remover paddle being arranged at a side of said sticking paddle which is opposite to a side of said sticking paddle at which said movable plate is arranged, said remover paddle being attached to said movable plate by a pin which penetrates said vertically extending slit of said sticking paddle.

10. A weeder as defined in claim 9, wherein said weeder further includes a remover paddle for removing the weeds and/or mud, said remover paddle having a blade, and said paddle body of said sticking paddle has a vertically extending slit, said remover paddle being arranged at a side of said sticking paddle which is opposite to a side of said sticking paddle at which said movable plate is arranged, said remover paddle being attached to said movable plate by a pin which penetrates said vertically extending slit of said sticking paddle.

* * * * *